United States Patent

Ota (10) Patent No.: US 9,683,473 B2
(45) Date of Patent: Jun. 20, 2017

(54) EXHAUST GAS CONTROL APPARATUS

(71) Applicant: TOYOTA JIDOSHA KABUSHIKI KAISHA, Toyota-shi, Aichi-ken (JP)

(72) Inventor: Hirohiko Ota, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/056,530

(22) Filed: Feb. 29, 2016

(65) Prior Publication Data
US 2016/0258332 A1    Sep. 8, 2016

(30) Foreign Application Priority Data

Mar. 2, 2015  (JP) ................. 2015-040422

(51) Int. Cl.
*F01N 3/00* (2006.01)
*F01N 3/20* (2006.01)
*B01D 53/94* (2006.01)

(52) U.S. Cl.
CPC ........ *F01N 3/208* (2013.01); *B01D 53/9431* (2013.01); *B01D 53/9495* (2013.01); *B01D 2251/2062* (2013.01); *F01N 2610/02* (2013.01); *F01N 2610/144* (2013.01); *F01N 2610/1406* (2013.01); *F01N 2610/146* (2013.01); *F01N 2900/1406* (2013.01); *F01N 2900/1602* (2013.01); *F01N 2900/1622* (2013.01); *F01N 2900/1626* (2013.01); *F01N 2900/1811* (2013.01); *Y02T 10/24* (2013.01)

(58) Field of Classification Search
CPC ............ B01D 53/9431; B01D 53/9495; B01D 2251/2062; F01N 3/208
USPC .......................................... 60/295
See application file for complete search history.

(56) References Cited

U.S. PATENT DOCUMENTS

| 2008/0271440 A1* | 11/2008 | Xu ................. B01D 53/9431 60/295 |
| 2010/0083641 A1* | 4/2010 | Makartchouk ........ F01N 3/2066 60/295 |
| 2010/0107612 A1* | 5/2010 | Yamazaki ............. B01D 53/90 60/295 |

(Continued)

FOREIGN PATENT DOCUMENTS

| JP | 2010-101262 A | 5/2010 |
| JP | 2013-133806 A | 7/2013 |

(Continued)

*Primary Examiner* — Jason Shanske
(74) *Attorney, Agent, or Firm* — Oliff PLC (57) ABSTRACT

An exhaust gas control apparatus includes an exhaust passage, a urea water tank, a urea adding valve, a urea pump, a pipe, and an electronic control unit. The electronic control unit is configured to drive the urea pump to perform a filling control when a condition requiring an execution of urea water addition to the exhaust gas in the exhaust passage by the urea adding valve is satisfied so that the pipe is filled with the urea water. The electronic control unit is configured to execute the filling control when an exhaust pressure of the exhaust passage is equal to or less than a specified value. The electronic control unit is configured to stop the filling control when the exhaust pressure of the exhaust passage exceeds the specified value during the execution of the filling control.

6 Claims, 2 Drawing Sheets (56) References Cited

U.S. PATENT DOCUMENTS

| | | | | |
|---|---|---|---|---|
| 2010/0242439 | A1* | 9/2010 | Domon | B01D 53/9431 60/274 |
| 2012/0023906 | A1* | 2/2012 | Yezerets | F01N 3/208 60/274 |
| 2012/0174562 | A1* | 7/2012 | Itoh | F01N 3/208 60/274 |
| 2013/0064718 | A1* | 3/2013 | Onodera | F01N 3/2066 422/108 |
| 2013/0180231 | A1* | 7/2013 | Miao | F01N 3/035 60/297 |
| 2013/0247543 | A1* | 9/2013 | Hirota | F01N 3/208 60/274 |
| 2014/0013726 | A1* | 1/2014 | Yacoub | F01N 3/32 60/274 |
| 2014/0230408 | A1* | 8/2014 | Gonze | F01N 3/10 60/274 |
| 2015/0023854 | A1* | 1/2015 | Lim | F01N 13/009 423/212 |

FOREIGN PATENT DOCUMENTS

| | | |
|---|---|---|
| JP | 2014-015855 A | 1/2014 |
| JP | 2015-028312 A | 2/2015 |
| WO | 2015/011532 A1 | 1/2015 |
| WO | 2015/015260 A1 | 2/2015 |

\* cited by examiner

FIG. 1

EXHAUST GAS CONTROL APPARATUS

INCORPORATION BY REFERENCE

The disclosure of Japanese Patent Application No. 2015-040422 filed on Mar. 2, 2015 including the specification, drawings and abstract is incorporated herein by reference in its entirety.

BACKGROUND

1. Technical Field

The disclosed embodiments relate to an exhaust gas control apparatus that performs urea water addition to exhaust gas and reduces and removes nitrogen oxide in the exhaust gas by selective catalytic reduction in which ammonia generated from urea water is used as a reducing agent.

2. Description of Related Art

In the exhaust gas control apparatus described above, a retro-suction control for suctioning the urea water back to a urea water tank from a pipe that sends the urea water to a urea adding valve is executed when an engine is stopped so that freezing of the urea water in the pipe is prevented, and a filling control for filling the pipe with the urea water is executed after the engine is started. The filling control is performed by a urea pump being driven so that the urea water is sent from the urea water tank to the urea adding valve by an amount which is enough for the pipe to be filled in a state where the urea adding valve is open. Nonetheless, when the engine is stopped within a short period of time after the engine is started and before any urea water addition to the exhaust gas has been executed, the filling control becomes in vain and thus the pump was driven unnecessarily. In the exhaust gas control apparatus according to the related art that is disclosed in Japanese Patent Application Publication No. 2010-101262, the filling control is performed after the engine is started and a catalyst bed temperature of a selective reduction-type catalyst device rises to close to an active catalyst temperature.

SUMMARY

In the exhaust gas control apparatus according to the related art described above, the filling control is performed after the catalyst bed temperature of the selective reduction-type catalyst device rises and the execution of the urea water addition becomes necessary instead of the filling control being performed immediately after the engine is started. Accordingly, it can be ensured that the driving of the pump that is attributable to the unnecessary filling control is suppressed. In this case, however, the filling control is performed after a full-scale operation of the engine is initiated, and thus an exhaust pressure in an exhaust passage during the filling control might increase depending on an engine operating situation. During the filling control, the exhaust pressure is applied into the pipe through the open urea adding valve, and thus air in the pipe might not be pushed out due to an insufficient discharge capacity of the urea pump when the exhaust pressure is high. In addition, in this case, the urea pump idles, i.e., runs with no urea water being suctioned, and a temperature of the urea pump increases. Accordingly, a driving time of the urea pump during the filling control should be limited in view of the temperature rise during the idling such that a seizure of the urea pump can be prevented. Accordingly, defective filling in the pipe occurs and the urea water cannot be appropriately added immediately after the initiation of the urea water addition process, which might cause the initiation of the urea water addition to be delayed.

The disclosed embodiments provide an exhaust gas control apparatus that is capable of suppressing defective filling during a filling control while suppressing driving of a pump attributable to an unnecessary filling control.

An exhaust gas control apparatus according to one aspect includes an exhaust passage, a urea water tank, a urea adding valve, a urea pump, a pipe, and an electronic control unit. The urea water tank is configured to store urea water. The urea adding valve communicates with the exhaust passage and is configured to add the urea water into exhaust gas flowing through the exhaust passage. The urea pump is configured to send the urea water from the urea water tank through the pipe to the urea adding valve. The pipe connects the urea water tank and the urea adding valve to each other. The selective reduction-type catalyst device is disposed in the exhaust passage downstream of the urea water adding valve and is configured to reduce nitrogen oxide in the exhaust gas by selective catalytic reduction in which ammonia generated from the urea water added by the urea adding valve is used as a reducing agent. The electronic control unit is configured to drive the urea pump to execute a filling control to fill the pipe with the urea water when a condition requiring an execution of urea water addition to the exhaust gas by the urea adding valve is satisfied. The electronic control unit is configured to execute the filling control when an exhaust pressure of the exhaust passage is equal to or less than a specified value. The electronic control unit is configured to stop executing the filling control when the exhaust pressure of the exhaust passage exceeds the specified value during the execution of the filling control.

In the exhaust gas control apparatus according to the aspect described above, the filling control is performed when the condition requiring the execution of the urea water addition to the exhaust gas is satisfied. Accordingly, an unnecessary execution of the filling control that is attributable to an engine stopping before execution of urea water addition despite the execution of the filling control can be suppressed. In addition, since the filling control is executed on the condition that the exhaust pressure is equal to or less than the specified value, an occurrence of defective filling that is attributable to the filling control being performed in a state where the exhaust pressure is high can be suppressed as well. Accordingly, driving of the pump that is attributable to an unnecessary filling control can be suppressed and the defective filling during the filling control can be suppressed.

The defective filling might occur in a case where the exhaust pressure increases during the execution of the filling control even though the exhaust pressure was low when the filling control was initiated. In this regard, the filling control is stopped when the exhaust pressure of the exhaust passage exceeds the specified value during the execution of the filling control, and thus the occurrence of the defective filling in that case can be further reliably suppressed as well.

In the exhaust gas control apparatus according to the aspect described above, the electronic control unit may be configured to calculate a catalyst bed temperature of the selective reduction-type catalyst device. The condition requiring the execution of the urea water addition may include the catalyst bed temperature at least a predetermined catalyst bed temperature.

In the exhaust gas control apparatus according to the aspect described above, the electronic control unit may be configured to calculate a tip temperature of the urea adding valve. The condition requiring the execution of the urea water addition may include the tip temperature being at least a predetermined tip temperature.

In the exhaust gas control apparatus according to the aspect described above, the electronic control unit may be configured to calculate an amount of the ammonia adhering to the selective reduction-type catalyst device. The condition requiring the execution of the urea water addition may include the amount of the ammonia adhering to the selective reduction-type catalyst device being less than a predetermined ammonia amount.

In the exhaust gas control apparatus according to the aspect described above, the exhaust passage may be connected to the engine. The electronic control unit may be configured to drive the urea pump when the engine is stopped such that the urea water in the pipe returns to the urea water tank.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
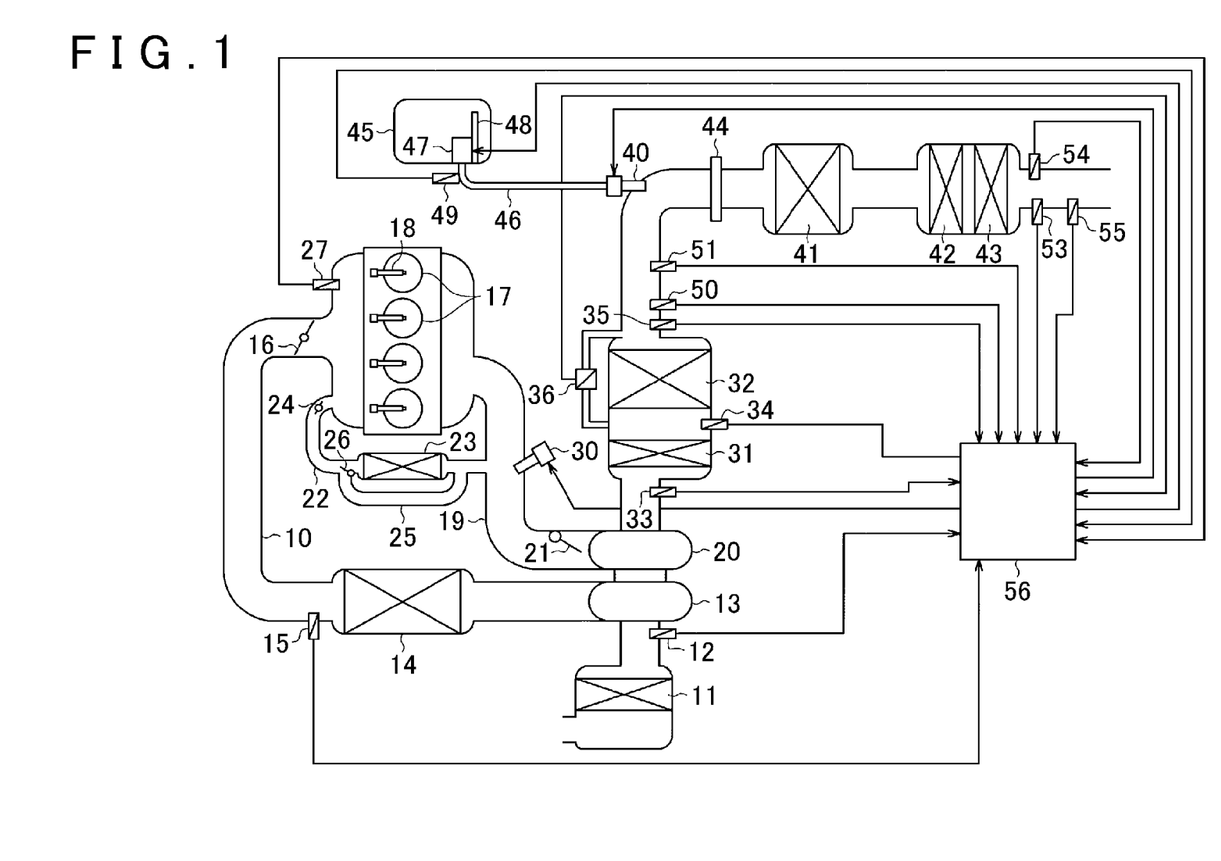
FIG. 1 is a schematic drawing illustrating configurations of an intake system and an exhaust system of a diesel engine to which an embodiment of an exhaust gas control apparatus is applied.

Hereinafter, an embodiment of an exhaust gas control apparatus will be described in detail with reference to FIGS. 1 and 2. As illustrated in FIG. 1, an air cleaner 11, an air flow meter 12, a compressor 13, an intercooler 14, an I/C-out gas temperature sensor 15, a throttle valve 16, and an intake pressure sensor 27 are disposed in order from an upstream side in an intake passage 10 of a diesel engine to which the exhaust gas control apparatus according to this embodiment is applied. The air cleaner 11 filters impurities in intake air. The air flow meter 12 detects a flow rate of the intake air flowing through the intake passage 10 (suctioned air amount). The compressor 13 pressurizes the intake air in response to driving of the compressor. The intercooler 14 cools the intake air passing through the compressor 13. The I/C-out gas temperature sensor 15 detects a temperature of the intake air passing through the intercooler 14. The throttle valve 16 adjusts the suctioned air amount by an opening degree of the throttle valve 16 being changed. The intake pressure sensor 27 detects a pressure of the intake air at a part of the intake passage 10 further downstream than the throttle valve 16.

The intake passage 10 is connected to each of cylinders 17 of the diesel engine on the downstream side of the throttle valve 16. Injectors 18 for fuel injection are disposed in the respective cylinders 17 of the diesel engine. Combustion of an air-fuel mixture of the intake air introduced through the intake passage 10 and a fuel injected from the injectors 18 is performed in each of the cylinders 17.

Exhaust gas resulting from the combustion of the air-fuel mixture in each of the cylinders 17 is released to the outside air through an exhaust passage 19. A turbine 20 is installed in the exhaust passage 19. The turbine 20 and the compressor 13 that is disposed in the intake passage 10 constitute an exhaust turbine-type turbocharger. The turbine 20 drives the compressor 13 by being rotated by a flow force of the exhaust gas that flows through the exhaust passage 19. In the exhaust passage 19, a variable nozzle 21 is installed at a part on the upstream side of the turbine 20. The variable nozzle 21 varies an exhaust gas spray outlet opening area with respect to the turbine 20. A rotation speed of the turbine 20 is adjusted through opening degree control by the variable nozzle 21.

The diesel engine is also provided with an exhaust gas recirculation (EGR) system that recirculates a part of the exhaust gas into the intake air. The EGR system is provided with an EGR passage 22, an EGR cooler 23, and an EGR valve 24. The EGR passage 22 allows a part of the exhaust passage 19 further upstream than the turbine 20 and a part of the intake passage 10 further downstream than the throttle valve 16 to communicate with each other. The EGR cooler 23 cools the exhaust gas that recirculates into the intake air through the EGR passage 22 (EGR gas). The EGR valve 24 adjusts a flow rate of the EGR gas. In addition, the EGR system is provided with a bypass passage 25 and a bypass valve 26. The bypass passage 25 allows the flow of the EGR gas to bypass the EGR cooler 23, and the bypass valve 26 adjusts the flow rate of the EGR gas that bypasses the EGR cooler 23 through the bypass passage 25.

A configuration of the exhaust gas control apparatus according to this embodiment that is applied to the diesel engine which has the above-described configuration will be described below. The exhaust gas control apparatus according to this embodiment is provided with a diesel particulate filter (DPF) system that collects particulate matter (PM) in the exhaust gas and a urea selective catalytic reduction (SCR) system that removes NOx from the exhaust gas by selective reduction in which ammonia generated from urea water is used as a reducing agent.

The DPF system is provided with a fuel adding valve 30, a front-stage oxidation catalyst device 31, and a PM collection filter 32. The fuel adding valve 30 is installed at a part of the exhaust passage 19 further upstream than the turbine 20. The front-stage oxidation catalyst device 31 is installed at a part of the exhaust passage 19 further downstream than the turbine 20 and further upstream than the PM collection filter 32. The fuel adding valve 30 adds the fuel into the exhaust gas, and the PM collection filter 32 captures the PM in the exhaust gas. The front-stage oxidation catalyst device 31 generates nitrogen dioxide (NO2) required for a continuous regeneration of the PM collection filter 32 by oxidizing a soluble organic fraction (SOF) component of the PM and oxidizing nitric oxide (NO) in the exhaust gas. In addition, the front-stage oxidation catalyst device 31 serves to raise a temperature of the PM collection filter 32 to a temperature required for PM combustion by oxidizing hydrocarbon (HC) in the fuel added by the fuel adding valve 30 and raising a temperature of the exhaust gas based on heat generation resulting from the oxidation reaction during a forced regeneration of the PM collection filter 32.

The DPF system is also provided with the following sensors for detecting a state of the exhaust gas at respective sections of the system. An in-gas temperature sensor 33, which detects the temperature of the exhaust gas that flows into the front-stage oxidation catalyst device 31, is installed at a part of the exhaust passage 19 further upstream than the front-stage oxidation catalyst device 31. A middle gas temperature sensor 34, which detects the temperature of the exhaust gas that flows into the PM collection filter 32, is installed at a part of the exhaust passage 19 between the front-stage oxidation catalyst device 31 and the PM collection filter 32. An out-gas temperature sensor 35, which detects the temperature of the exhaust gas that flows out from the PM collection filter 32, is installed at a part of the exhaust passage 19 further downstream than the PM collection filter 32. A differential pressure sensor 36, which detects a difference between pressures of the exhaust gas in front of and behind the PM collection filter 32, is installed at a part of the exhaust passage 19 where the PM collection filter 32 is installed.

The urea SCR system is provided with a urea adding valve 40, two, front and rear, SCR devices, that is, a front-stage SCR device 41 and a rear-stage SCR device 42, and an ammonia slip catalyst (ASC) device 43. The urea adding valve 40 is installed at a part of the exhaust passage 19 on the downstream side of the PM collection filter 32 and adds the urea water to the exhaust gas. The front-stage SCR device 41 and the rear-stage SCR device 42 are selective reduction-type catalyst devices that reduce nitrogen oxide in the exhaust gas by using ammonia generated from urea through exhaust heat-based hydrolysis as a reducing agent. The front-stage SCR device 41 is installed at a part of the exhaust passage 19 further downstream than the urea adding valve 40. The rear-stage SCR device 42 is installed at a part of the exhaust passage 19 further downstream than the front-stage SCR device 41. The ASC device 43 is an oxidation catalyst device that oxidizes the ammonia which flows out by slipping through the front-stage SCR device 41 and the rear-stage SCR device 42. The ASC device 43 is installed at a part of the exhaust passage 19 further downstream than the rear-stage SCR device 42. A dispersion plate 44 for dispersing the urea water added by the urea adding valve 40 into the exhaust gas is installed at a part of the exhaust passage 19 between the urea adding valve 40 and the front-stage SCR device 41.

The urea water that is added to the exhaust gas by the urea adding valve 40 is stored in a urea water tank 45. The urea water tank 45 is connected to the urea adding valve 40 through a heater-attached pipe 46. The urea water tank 45 has a urea pump 47 installed therein. The urea water in the urea water tank 45 is pumped up by the urea pump 47 and is sent to the urea adding valve 40 through the pipe 46. A urea water level sensor 48 that detects the amount of the urea water remaining in the urea water tank 45 is disposed in the urea water tank 45. A urea water temperature sensor 49 is installed on the pipe 46. The urea water temperature sensor 49 detects a temperature of the urea water sent to the urea adding valve 40.

The urea SCR system is also provided with the following sensors for detecting the state of the exhaust gas at respective sections of the system. An in-NOx sensor 50 and an air-fuel ratio sensor 51 are installed at parts of the exhaust passage 19 between the PM collection filter 32 and the urea adding valve 40. The in-NOx sensor 50 detects the amount of the NOx in the exhaust gas that flows into the front-stage SCR device 41. The air-fuel ratio sensor 51 generates an output in accordance with oxygen/unburned fuel concentrations of the exhaust gas. The output is used for an air-fuel ratio of the air-fuel mixture burned in the cylinders 17 to be grasped. An out-NOx sensor 53, a post-ASC gas temperature sensor 54, and a PM sensor 55 are installed at parts of the exhaust passage 19 further downstream than the ASC device 43. The out-NOx sensor 53 detects the amount of the NOx in the exhaust gas that flows out from the ASC device 43. The post-ASC gas temperature sensor 54 detects the temperature of the exhaust gas that flows out from the ASC device 43. The PM sensor 55 detects the amount of the PM flowing out from the ASC device 43 and released to the outside air.

In this exhaust gas control apparatus, the fuel addition by the fuel adding valve 30 and the urea water addition by the urea adding valve 40 are controlled by an electronic control unit 56. The electronic control unit 56 is provided with a central calculation processing device (CPU) that performs a calculation processing for control, a read-only memory (ROM) in which a program and data for control are stored, a readable and writable memory (RAM) in which a result of the calculation by the central calculation processing device and results of the detection by the respective sensors are temporarily stored, input ports for receiving signals from the outside, and output ports for transmitting signals to the outside. The respective sensors described above are connected to the input ports of the electronic control unit 56. The fuel adding valve 30 and the urea adding valve 40 are connected to the output ports of the electronic control unit 56. The electronic control unit 56 controls fuel and ammonia addition amounts with respect to the exhaust gas by controlling driving of the fuel adding valve 30 and the urea adding valve 40.

The urea pump 47 is connected to the output port of the electronic control unit 56 as well. The electronic control unit 56 controls delivery of the urea water toward the urea adding valve 40 and retro-suction of the urea water from the pipe 46 by driving the urea pump 47. In the exhaust gas control apparatus according to this embodiment, the electronic control unit 56 functions as a pump control unit.

While the diesel engine is in operation, the electronic control unit 56 controls urea water additions each having the purpose of NOx removal, cooling of the urea adding valve 40, and recovery of ammonia adhesion amounts of the front-stage SCR device 41 and the rear-stage SCR device 42.

The urea water addition for NOx removal (hereinafter, referred to as addition for NOx removal) is performed so that the front-stage SCR device 41 and the rear-stage SCR device 42 are supplied with the amount of urea that is required for the removal of the NOx from the exhaust gas. During the addition for NOx removal, the electronic control unit 56 calculates a urea water addition amount that is required for a state where the front-stage SCR device 41 and the rear-stage SCR device 42 are adhered with a specified amount of ammonia to be maintained and commands the urea adding valve 40 to add the urea water by the calculated amount. This addition for NOx removal is performed when various conditions are satisfied, i.e., when an estimated value of a catalyst bed temperature of the front-stage SCR device 41 and the rear-stage SCR device 42 (hereinafter, referred to as an estimated SCR bed temperature TSCR) is at least an active catalyst temperature $\alpha$ and when a filling control has been completed.

The estimated SCR bed temperature TSCR is obtained as a value obtained by multiplying a value of the exhaust gas temperature detected by the out-gas temperature sensor 35 by a temperature drop coefficient. The temperature drop coefficient is a correction coefficient for correcting an exhaust gas temperature decrease between the front- and rear-stage SCR devices 41, 42 and the position where the out-gas temperature sensor 35 is installed. The temperature drop coefficient is a value less than "1". In this embodiment, the value of the temperature drop coefficient is set to be variable depending on an outside temperature. Specifically, the value of the temperature drop correction coefficient decreases as the outside temperature decreases and a pipe wall of the exhaust passage 19 is increasingly cooled.

A calculation of this estimated SCR bed temperature TSCR is performed by the electronic control unit 56. Accordingly, in this embodiment, the electronic control unit 56 functions as a catalyst bed temperature calculator for calculating the catalyst bed temperature of the selective reduction-type catalyst device.

The urea water addition for cooling the urea adding valve 40 (hereinafter, referred to as addition for cooling) is performed so that the urea adding valve 40 in an overheating state is cooled. The addition for cooling is performed when various conditions are satisfied, i.e., when an estimated value of a tip temperature of the urea adding valve 40 (hereinafter, referred to as an estimated tip temperature TINJ) is at least a specified value $\beta$ and when the filling control has been completed. When the execution condition for the addition for cooling is satisfied, the electronic control unit 56 adds the urea water by an amount required for the tip temperature of the urea adding valve 40 to be lowered to a temperature lower than the specified value $\beta$, and then stops the addition for cooling. The electronic control unit 56 obtains a calculated value of the exhaust gas flow rate (hereinafter, referred to as an exhaust gas flow rate GAEX) as a sum of a value of the suctioned air amount (mass) detected by the air flow meter 12 and the amount of fuel injection (mass) from the injectors 18.

The estimated tip temperature TINJ is obtained from the value of the exhaust gas temperature detected by the out-gas temperature sensor 35, the calculated value of the exhaust gas flow rate, and a situation in which the urea water addition by the urea adding valve 40 is performed. Specifically, a value that is obtained based on a correction of the value of the exhaust gas temperature detected by the out-gas temperature sensor 35 in view of an exhaust gas temperature decrease between the position where the urea adding valve 40 is installed and the position where the out-gas temperature sensor 35 is installed is obtained first as a base value of the estimated tip temperature TINJ. Then, the value of the estimated tip temperature TINJ is calculated by multiplying the base value by a correction coefficient based on the exhaust gas temperature, a correction coefficient based on the exhaust gas flow rate, and a correction coefficient based on the urea water addition amount. The correction coefficient based on the exhaust gas temperature is set to a value that increases as the value of the exhaust gas temperature detected by the out-gas temperature sensor 35 increases to take account of the tip temperature increasing as the temperature of the exhaust gas flowing around a tip of the urea adding valve 40 increases. The correction coefficient based on the exhaust gas flow rate is set to a value that increases as the calculated value of the exhaust gas flow rate increases to take account of the tip temperature increasing as the flow rate of the exhaust gas flowing around the tip of the urea adding valve 40 increases. The correction coefficient based on the urea water addition amount is set to a value that decreases as the urea water addition amount increases in view of the cooling of the urea adding valve 40 by the urea water during the addition.

The calculation of the estimated tip temperature TINJ is performed by the electronic control unit 56. Accordingly, in this embodiment, the electronic control unit 56 functions as a tip temperature calculator for calculating the tip temperature of the urea adding valve.

The urea water addition for ammonia adhesion amount recovery (hereinafter, referred to as addition for adhesion recovery) is performed when the amount of the ammonia adhering to the front-stage SCR device 41 and the rear-stage SCR device 42 is insufficient; and the adhesion recovery causes the adhesion amount to be recovered to a sufficient amount. The addition for adhesion recovery is performed when various conditions are satisfied, i.e., when an estimated value of the amount of the ammonia adhering to the front-stage SCR device 41 and the rear-stage SCR device 42 (hereinafter, referred to as an estimated ammonia adhesion amount AMMO) is less than a specified value $\gamma$ and when the filling control has been terminated. When the execution condition for the addition for adhesion recovery is satisfied, the electronic control unit 56 adds the urea water by an amount required for the estimated ammonia adhesion amount AMMO to become at least the specified value $\gamma$, and then stops the addition for adhesion recovery.

The estimated ammonia adhesion amount AMMO is obtained from the value of the amount of the NOx detected by the in-NOx sensor 50, the amount of the urea water addition by the urea adding valve 40, and the estimated SCR bed temperature TSCR. Specifically, the amount of ammonia newly adhering to the front-stage SCR device 41 and the rear-stage SCR device 42 is obtained first from the urea water addition amount and a base value of the estimated ammonia adhesion amount AMMO is obtained by an integration thereof over time. Then, the estimated ammonia adhesion amount AMMO is obtained by multiplying the base value by a correction coefficient based on the NOx amount and a correction coefficient based on the bed temperature. The correction coefficient based on the NOx amount is set to a value that increases as the value of the NOx amount detected by the in-NOx sensor 50 increases to take account of the urea water addition amount increasing as the NOx amount increases. The correction coefficient based on the bed temperature is set to a value that decreases as the estimated SCR bed temperature TSCR increases to take account of the ammonia becoming less and less likely to adhere as the bed temperature of the front-stage SCR device 41 and the rear-stage SCR device 42 increases.

The calculation of the estimated ammonia adhesion amount AMMO is performed by the electronic control unit 56. Accordingly, in this embodiment, the electronic control unit 56 functions as an ammonia amount calculator for calculating the amount of the ammonia adhering to the selective reduction-type catalyst device.

The electronic control unit 56 also performs a retro-suction control for preventing the urea water from freezing in the pipe 46 by achieving a state where the pipe 46 lacks the urea water while the engine is stopped. The retro-suction control is performed on condition that a filling execution flag (described later) is set when the diesel engine is stopped. After the initiation of the retro-suction control, the electronic control unit 56 opens the urea adding valve 40 and drives the urea pump 47 such that the urea water is suctioned back into the urea water tank 45 from the pipe 46. The electronic control unit 56 closes the urea adding valve 40 and completes the retro-suction control after continuing the driving of the urea pump 47 for a specified period of time. The driving time of the urea pump 47 in this case is set to a length of time that ensures the urea water equivalent to the volume of the pipe 46 to be suctioned back to the urea water tank 45. The electronic control unit 56 clears a retro-suction completion flag when the retro-suction control is initiated and sets the retro-suction completion flag when the retro-suction control is completed. A value of the retro-suction completion flag is stored in a non-volatile memory and is retained even while the engine is stopped. Accordingly, the retro-suction completion flag that is set means that the retro-suction control was performed up to the last moment while the diesel engine was stopped in the previous trip.

In addition, the electronic control unit 56 performs the filling control for filling the pipe 46 with the urea water before the execution of the urea water addition to the exhaust gas.

Figure 2:
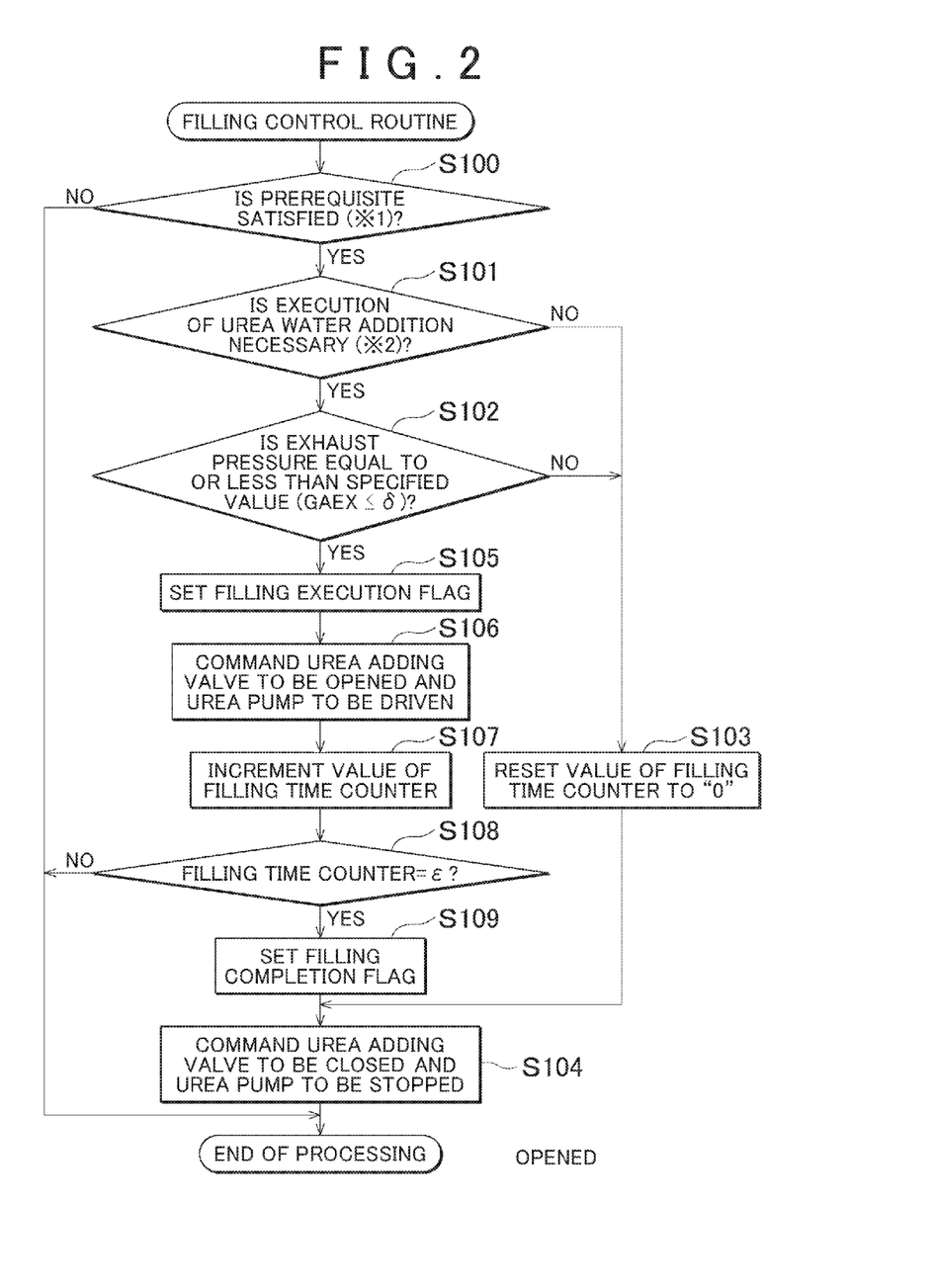
FIG. 2 is a flowchart illustrating a filling control routine that is executed in the exhaust gas control apparatus according to this embodiment.

FIG. 2 is a flowchart illustrating a filling control routine that the electronic control unit 56 executes for the execution of the filling control and an execution determination regarding the filling control. While the diesel engine is in operation, the electronic control unit 56 repeatedly executes the processing of this routine at specified control intervals.

In Step S100, which is the first step following an initiation of the processing of this routine, it is determined whether or not a prerequisite for the filling control is satisfied. Specifically, the prerequisite for the filling control is satisfied when all of the following (i) to (iii) are satisfied.

(i) Setting of the retro-suction completion flag described above (ii) Setting of an operation initiation flag of the SCR system (iii) Clearing of a filling completion flag The operation initiation flag of the SCR system remains cleared when the diesel engine is started and is set at a point in time when an operation check regarding the system (such as the respective sensors, the urea adding valve 40, and the urea pump 47) is terminated and heater-based heating of the pipe 46 for a specified period of time after the starting of the engine is completed. The filling completion flag remains cleared when the diesel engine is started and is set when the filling control is completed. As described above, the retro-suction completion flag remains set insofar as the retro-suction control is completed when the diesel engine is stopped in the previous trip.

Then, in Step S101, it is determined whether or not the execution of each of the urea water additions for NOx removal, cooling, and adhesion recovery described above is necessary. Specifically, it is determined whether or not any one of the following (iv) to (vi) is satisfied. The processing proceeds to Step S102 when any one of the following (iv) to (vi) is satisfied and it is determined that the execution of the urea water addition is necessary (YES). The processing proceeds to Step S103 when none of the following (iv) to (vi) is satisfied and it is determined that the execution of the urea water addition is unnecessary.

(iv) The estimated SCR bed temperature TSCR being at least the active temperature $\alpha$ (v) The estimated tip temperature TINJ being at least the specified value $\beta$ (vi) The estimated ammonia adhesion amount AMMO being less than the specified value $\gamma$ After the processing has proceeded to Step S102, it is determined in Step S102 whether or not an exhaust pressure is equal to or less than a specified value. This determination is performed by using the exhaust gas flow rate GAEX as an index value representative of the exhaust pressure at the part of the exhaust passage 19 where the urea adding valve 40 is installed. When the exhaust gas flow rate GAEX is equal to or less than a specified value $\delta$, it is determined that the exhaust pressure is equal to or less than the specified value. An exhaust gas flow rate pertaining to a case where the exhaust pressure at the part of the exhaust passage 19 where the urea adding valve 40 is installed becomes an upper limit value of the exhaust pressure at which the pipe 46 can be ensured to be filled with the urea water is set as the specified value $\delta$. When it is determined that the exhaust pressure is equal to or less than the specified value (YES), the processing proceeds to Step S105. When it is determined that the exhaust pressure exceeds the specified value (NO), the processing proceeds to Step S103.

After the processing has proceeded to Step S105 based on positive determinations in both Steps S101 and S102, the filling execution flag is set in Step S105. The filling execution flag remains cleared when the engine is started. Once the filling execution flag is set, the filling execution flag remains set until the engine is stopped.

In the subsequent Step S106, the urea adding valve 40 is commanded to be opened and the urea pump 47 is commanded to be driven so that the pipe 46 is filled with the urea water. In the subsequent Step S107, the processing proceeds to Step S108 after an increment in a value of a filling time counter. The value of the filling time counter represents the driving time of the urea pump 47 after the initiation of the filling control. The value of the filling time counter is "0" when the engine is started.

After the processing has proceeded to Step S108, it is determined in Step S108 whether or not the value of the filling time counter has reached a specified filling completion determination value $\epsilon$. The number of increments in the filling time counter that corresponds to the driving time of the urea pump 47 which ensures the filling of the pipe 46 with the urea water to be completed is set as the filling completion determination value $\epsilon$ in view of the volume of the pipe 46 and a urea water discharge capacity of the urea pump 47. The processing proceeds to Step S109 provided that the value of the filling time counter has reached the filling completion determination value $\epsilon$ (YES). The current processing is terminated as it is provided that the value of the filling time counter has not reached the filling completion determination value $\epsilon$ (NO).

After the processing has proceeded to Step S109, the filling completion flag is set in Step S109. After the urea adding valve 40 is commanded to be closed and the urea pump 47 is commanded to be stopped in Step S104 described above, the current processing of this routine is terminated.

After the processing has proceeded to Step S103 based on a negative determination in either one of Steps S101 and S102 described above, the value of the filling time counter is reset to "0" in Step S103. Then, in the subsequent Step S104, the urea adding valve 40 is commanded to be closed and the urea pump 47 is commanded to be stopped, and then the current processing of this routine is terminated. In other words, when the processing has proceeded to Steps S103 and S104 in a state where the operation of the filling time counter in the processing of Step S107 and the command for opening the urea adding valve 40 and the command for driving the urea pump 47 in the processing of Step S106 are not performed, no substantial processing is performed in these steps (Steps S103 and S104).

Effects of the exhaust gas control apparatus according to this embodiment will be described below. In the exhaust gas control apparatus according to this embodiment, the retro-suction control is executed when the engine is stopped, and thus the pipe 46 lacks the urea water when the diesel engine is started. When it is determined that the execution of the urea water addition is necessary and the exhaust pressure is equal to or less than the specified value after the engine is started, the filling control is executed so that the pipe 46 is filled with the urea water. After the initiation of the filling control, the urea adding valve 40 is opened and the driving of the urea pump 47 for filling the pipe 46 with the urea water is initiated. Then, the urea pump 47 is driven for a period of time that is required for the pipe 46 to be filled with the urea water, and then the urea adding valve 40 is closed and the urea pump 47 is stopped. In this manner, the filling control is completed.

In the exhaust gas control apparatus according to this embodiment, the filling control is not executed in a case where the diesel engine is stopped within a short period of time before it is determined that the execution of the urea water addition is necessary. Since the filling control is executed on condition that the exhaust pressure is equal to or less than the specified value, defective filling that is attributable to the urea water which is sent to the pipe 46 by the urea pump 47 being pushed back by the pressure of the exhaust gas is unlikely to occur.

The filling control is stopped when the exhaust pressure of the exhaust passage 19 exceeds the specified value during the execution of the filling control. The filling control in this case is re-executed when the exhaust pressure falls below the specified value thereafter. In other words, in this embodiment, the value of the filling time counter is cleared (in Step S108) when the exhaust pressure of the exhaust passage 19 exceeds the specified value during the execution of the filling control, and thus the driving of the urea pump 47 for a specified period of time is performed even when the filling control is re-executed thereafter. In other words, when the filling control is stopped in this embodiment, the filling control is re-executed from the beginning thereafter. Meanwhile, the value of the filling time counter may be retained even when the exhaust pressure of the exhaust passage 19 exceeds the specified value during the execution of the filling control and the filling control may be resumed from the middle when the exhaust pressure falls below the specified value thereafter.

In a case where no filling control is executed between the start and stop of the diesel engine, the filling execution flag remains cleared. Accordingly, in this case, the retro-suction control during the stop of the engine is not executed, either. In addition, the filling execution flag is set (in Step S105) even when the filling control is executed to the middle (i.e., is started but not completed). Accordingly, in this case, the retro-suction control during the stop of the engine is executed.

The following effects can be achieved by the exhaust gas control apparatus according to this embodiment described above. (1) Since the filling control is performed when it is determined that the execution of the urea water addition by the urea adding valve 40 is necessary and the exhaust pressure of the exhaust passage 19 is equal to or less than the specified value, driving of the pump that is attributable to an unnecessary filling control can be suppressed and the defective filling during the filling control can be suppressed.

(2) When the exhaust pressure exceeds the specified value during the execution of the filling control, the filling control is stopped. Accordingly, the defective filling during the filling control can be further reliably suppressed. (3) The filling control is not executed under a high exhaust pressure and no limitation is necessary regarding the driving time of the urea pump 47 during the filling control in view of a rise in temperature resulting from idling. Accordingly, the driving time of the urea pump 47 can be extended during the filling control, and the pipe 46 can be further reliably filled with the urea water.

(4) A large discharge capacity of the urea pump that allows the filling to be completed even under a high exhaust pressure is not necessary, and thus the urea pump 47 that is adopted herein can be less expensive and have a small discharge capacity. (5) When no filling control is executed between the start and stop of the diesel engine, the retro-suction control during the stop of the engine is not executed, either. Accordingly, driving of the pump resulting from an unnecessary retro-suction control is suppressed.

The embodiment described above can be carried out in the following modified forms. In the embodiment described above, the catalyst bed temperature (the estimated SCR bed temperature TSCR) of the selective reduction-type catalyst device (the front-stage SCR device 41 and the rear-stage SCR device 42) is calculated as a value that is estimated from a result of the detection by the out-gas temperature sensor 35 or the like. However, the catalyst bed temperature may be calculated from a detection signal of a sensor that directly detects the catalyst bed temperature of the front-stage SCR device 41 and the rear-stage SCR device 42.

In the embodiment described above, the tip temperature (the estimated tip temperature TINJ) of the urea adding valve 40 is calculated as a value that is estimated from the value of the exhaust gas temperature detected by the out-gas temperature sensor 35, the calculated value of the exhaust gas flow rate, the situation in which the urea water addition by the urea adding valve 40 is performed, and the like. However, the tip temperature may be calculated from a detection signal of a sensor that is installed to directly detect the tip temperature of the urea adding valve 40.

In the embodiment described above, the amount of the ammonia adhering to the selective reduction-type catalyst device (the front-stage SCR device 41 and the rear-stage SCR device 42) is calculated as a value that is estimated from the value of the amount of the NOx detected by the in-NOx sensor 50, the amount of the urea water addition by the urea adding valve 40, and the estimated SCR bed temperature TSCR. However, the amount of the ammonia may be calculated from detection signals of sensors that are disposed in the front-stage SCR device 41 and the rear-stage SCR device 42 and installed to detect the amount of the internally adhering ammonia.

The urea water addition for ammonia adhesion amount recovery (hereinafter, referred to as addition for adhesion recovery) is performed when the amount of the ammonia adhering to the front-stage SCR device 41 and the rear-stage SCR device 42 is insufficient so that the adhesion amount is recovered to a sufficient amount. The addition for adhesion recovery is performed when various conditions are satisfied, i.e., when an estimated value of the amount of the ammonia adhering to the front-stage SCR device 41 and the rear-stage SCR device 42 (hereinafter, referred to as an estimated ammonia adhesion amount AMMO) is less than a specified value $\gamma$ and when the filling control is terminated. When the execution condition for the addition for adhesion recovery is satisfied, the electronic control unit 56 adds the urea water by an amount required for the estimated ammonia adhesion amount AMMO to become at least the specified value $\gamma$, and then stops the addition for adhesion recovery.

The estimated ammonia adhesion amount AMMO is obtained from the value of the amount of the NOx detected by the in-NOx sensor 50, the amount of the urea water addition by the urea adding valve 40, and the estimated SCR bed temperature TSCR. Specifically, the amount of ammonia newly adhering to the front-stage SCR device 41 and the rear-stage SCR device 42 is obtained first from the urea water addition amount and a base value of the estimated ammonia adhesion amount AMMO is obtained by an integration thereof over time. Then, the estimated ammonia adhesion amount AMMO is obtained by multiplying the base value by a correction coefficient based on the NOx amount and a correction coefficient based on the bed temperature. The correction coefficient based on the NOx amount is set to a value that increases as the value of the NOx amount detected by the in-NOx sensor 50 increases to take account of the urea water addition amount increasing as the NOx amount increases. The correction coefficient based on the bed temperature is set to a value that decreases as the estimated SCR bed temperature TSCR increases to take account of the ammonia becoming less and less likely to adhere as the bed temperature of the front-stage SCR device 41 and the rear-stage SCR device 42 increases.

The calculation of the estimated ammonia adhesion amount AMMO is performed by the electronic control unit 56. Accordingly, in this embodiment, the electronic control unit 56 functions as an ammonia amount calculator for calculating the amount of the ammonia adhering to the selective reduction-type catalyst device.

In the embodiment described above, no retro-suction control is performed when the diesel engine is stopped with the filling control not executed. However, the retro-suction control may be performed regardless of the execution or non-execution of the filling control. In this case, the freezing of the urea water that remains in the pipe 46 while the engine is stopped can be further reliably prevented.

In the embodiment described above, it is determined that the execution of the urea water addition is necessary when any of the above-described conditions (iv) to (vi) is satisfied. However, the conditions for satisfying the determination may be appropriately changed. For example, in a case where any of the addition for NOx removal, the addition for cooling, and the addition for adhesion recovery is not executed in the exhaust gas control apparatus, the condition correlated with the urea water addition that is not executed may be omitted. In a case where urea water addition is performed for a purpose other than the three purposes described above, a condition correlated therewith may be added.

In the embodiment described above, the exhaust gas flow rate GAEX is calculated and obtained from the detected value of the suctioned air amount and the amount of fuel injection. However, the exhaust gas flow rate GAEX may be obtained from a result of detection by a flow rate sensor that is installed in the exhaust passage 19.

In the embodiment described above, it is determined whether or not the exhaust pressure is equal to or less than the specified value by the exhaust gas flow rate GAEX being used as the index value of the exhaust pressure. However, this determination may be performed based on a detected value or an estimated value of the exhaust pressure.

In the embodiment described above, the filling control is stopped when the exhaust pressure exceeds the specified value during the execution of the filling control. However, the filling control may continue even when the exhaust pressure exceeds the specified value. Even in this case, the filling control is initiated under a low exhaust pressure, and thus the occurrence of the defective filling can be further suppressed than in a case where the filling control is executed regardless of the level of the exhaust pressure.

What is claimed is:

1. An exhaust gas control apparatus comprising:
   an exhaust passage;
   a urea water tank configured to store urea water;
   a urea adding valve in communication with the exhaust passage and configured to add the urea water into exhaust gas flowing through the exhaust passage;
   a pipe connecting the urea water tank and the urea adding valve to each other;
   a urea pump configured to send the urea water from the urea water tank through the pipe to the urea adding valve;
   a selective reduction-type catalyst device disposed in the exhaust passage downstream of the urea adding valve and configured to reduce nitrogen oxide in the exhaust gas by selective catalytic reduction in which ammonia generated from the urea water added by the urea adding valve is used as a reducing agent; and
   an electronic control unit configured to drive the urea pump to execute a filling control to fill the pipe with the urea water when a condition requiring an execution of urea water addition to the exhaust gas by the urea adding valve is satisfied, the electronic control unit being configured to execute the filling control and open the urea adding valve when an exhaust pressure of the exhaust passage is equal to or less than a specified value, and the electronic control unit being configured to stop executing the filling control and close the urea adding valve when the exhaust pressure of the exhaust passage exceeds the specified value during the execution of the filling control.

2. The exhaust gas control apparatus according to claim 1, wherein the electronic control unit is configured to calculate a catalyst bed temperature of the selective reduction-type catalyst device, the condition requiring the execution of the urea water addition including the catalyst bed temperature being at least a predetermined catalyst bed temperature.

3. The exhaust gas control apparatus according to claim 1, wherein the electronic control unit is configured to calculate a tip temperature of the urea adding valve, the condition requiring the execution of the urea water addition including the tip temperature being at least a predetermined tip temperature.

4. The exhaust gas control apparatus according to claim 1, wherein the electronic control unit is configured to calculate an amount of the ammonia adhering to the selective reduction-type catalyst device, the condition requiring the execution of the urea water addition including the amount of the ammonia adhering to the selective reduction-type catalyst device being less than a predetermined ammonia amount.

5. The exhaust gas control apparatus according to claim 1, wherein
   the exhaust passage is connected to an engine, and
   the electronic control unit is configured to drive the urea pump in reverse when the engine is stopped so that the urea water in the pipe returns to the urea water tank.

6. The exhaust gas control apparatus according to claim 1, wherein the urea water is not present in at least a portion of the pipe before the electronic control unit executes the filling control.

* * * * *